Dec. 7, 1948.　　　　B. KUYKENDALL　　　　2,455,369
MANUALLY GUIDED TWO-WHEELED
PORTABLE CIRCULAR POWER SAW
Filed April 12, 1946　　　　　　　　　　　　　4 Sheets-Sheet 1
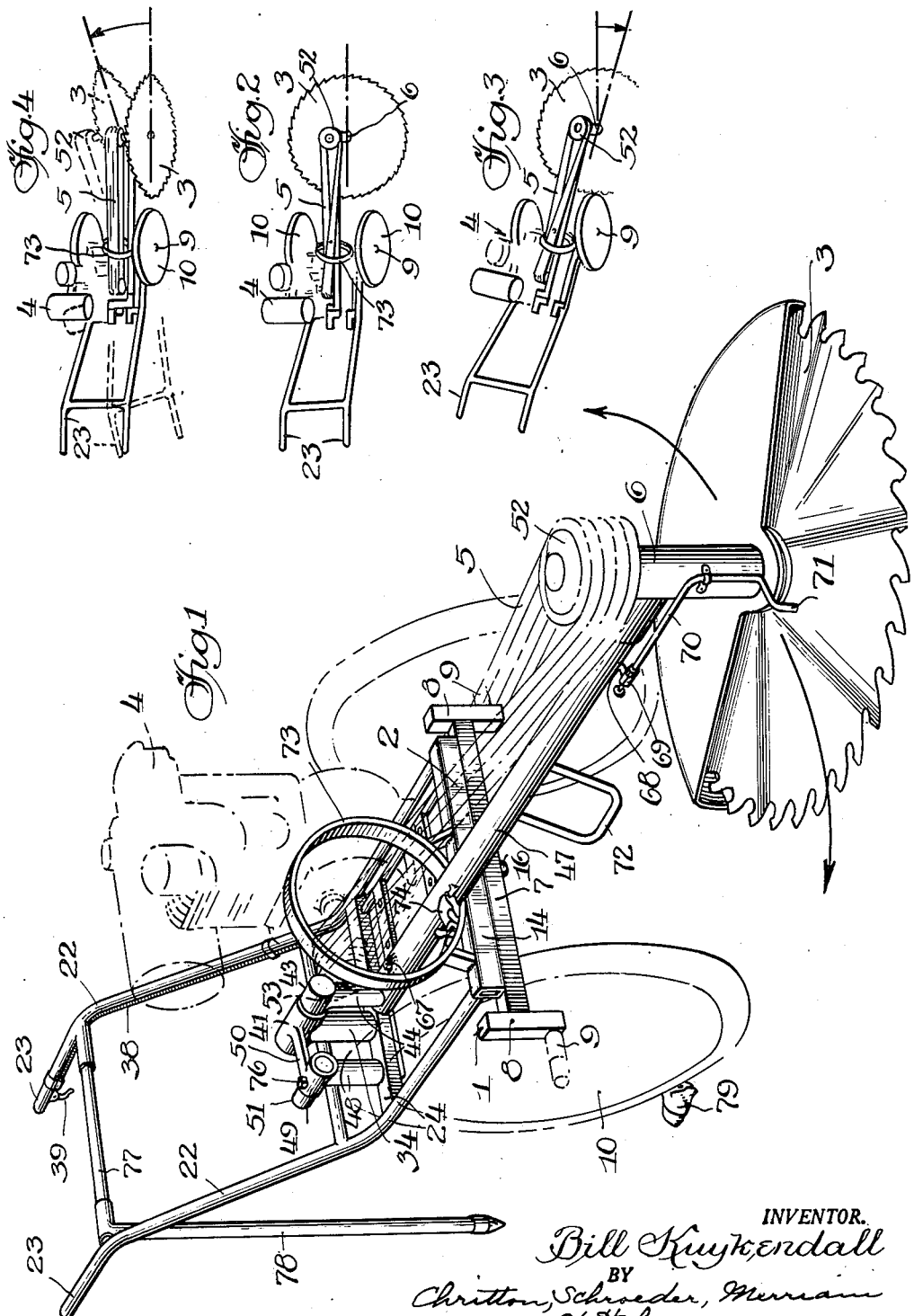
INVENTOR.
Bill Kuykendall
BY
Chritton, Schroeder, Merriam
& Hofgren
Atty's.

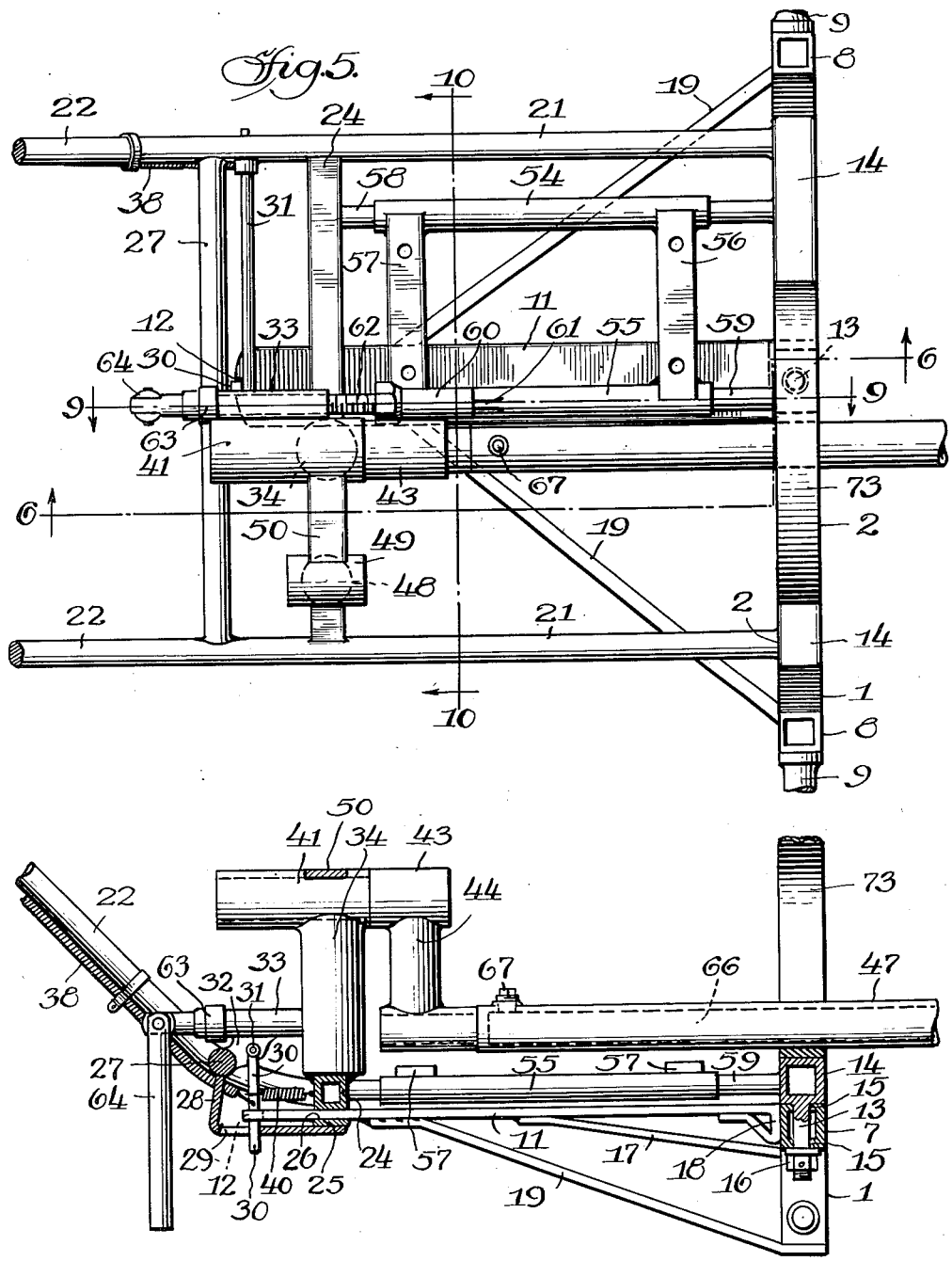

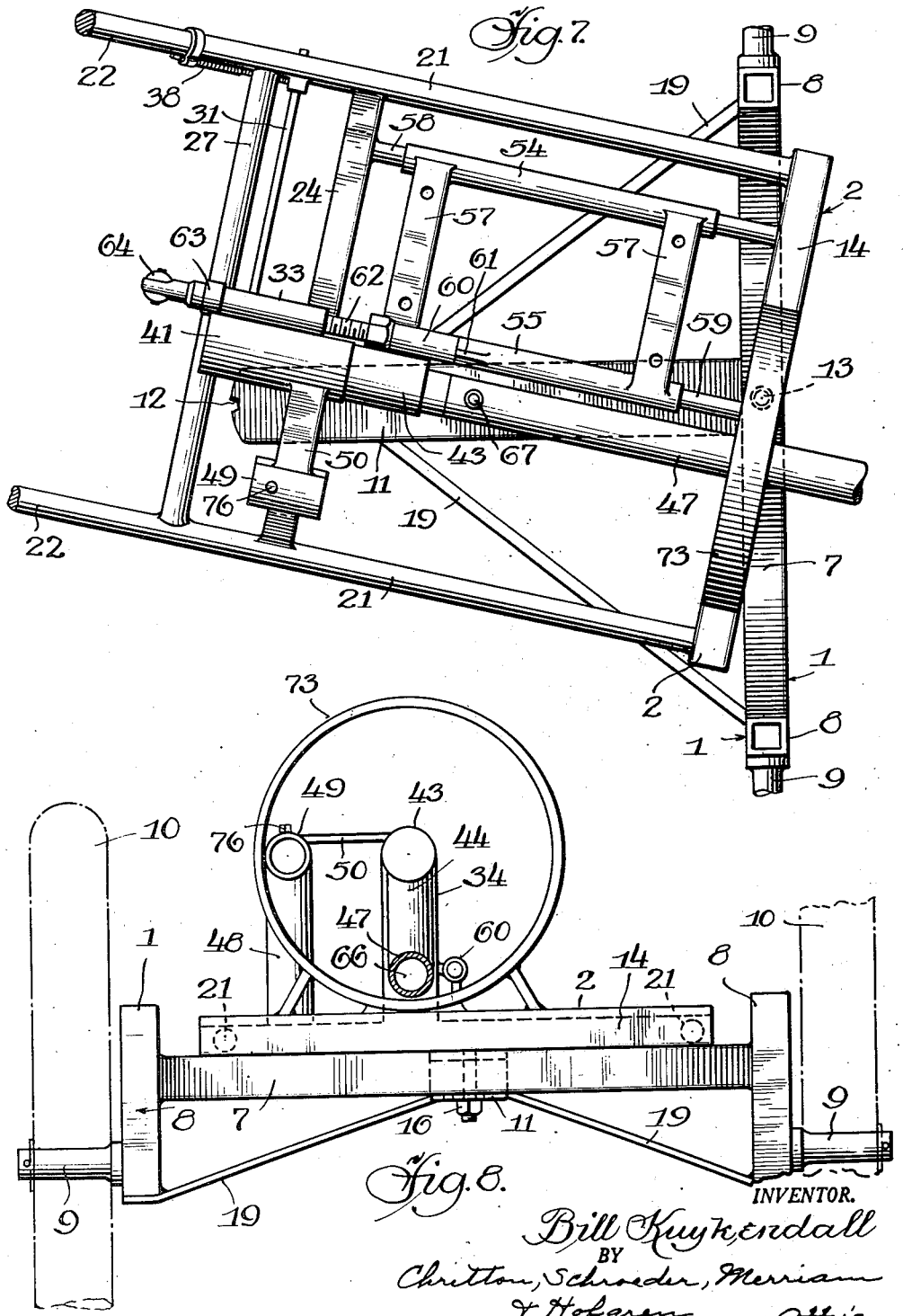

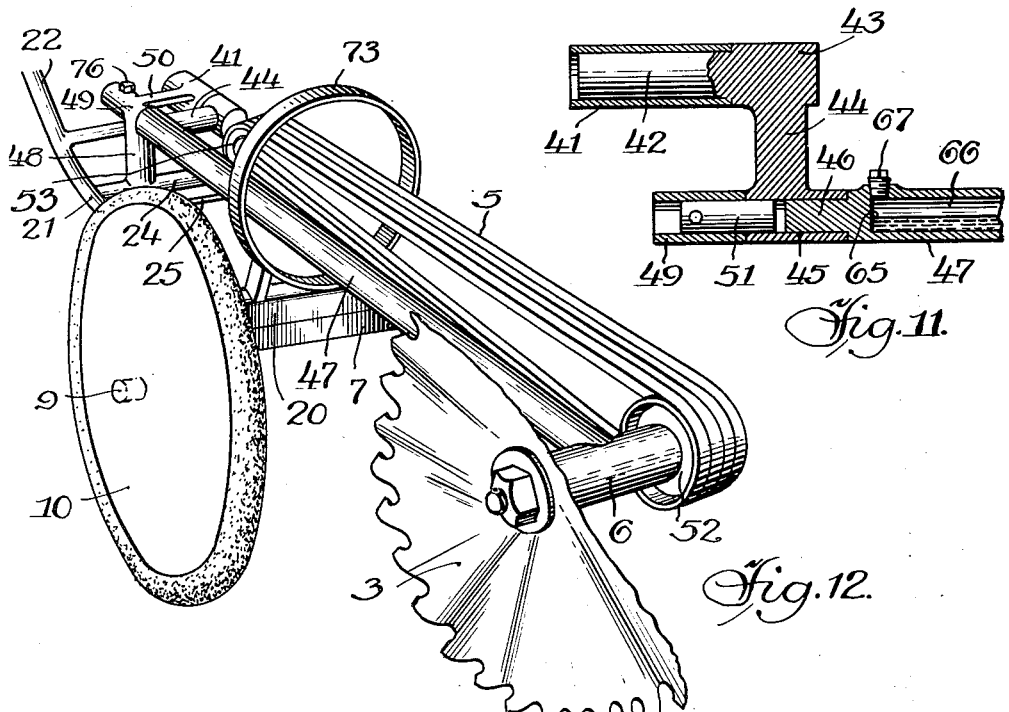
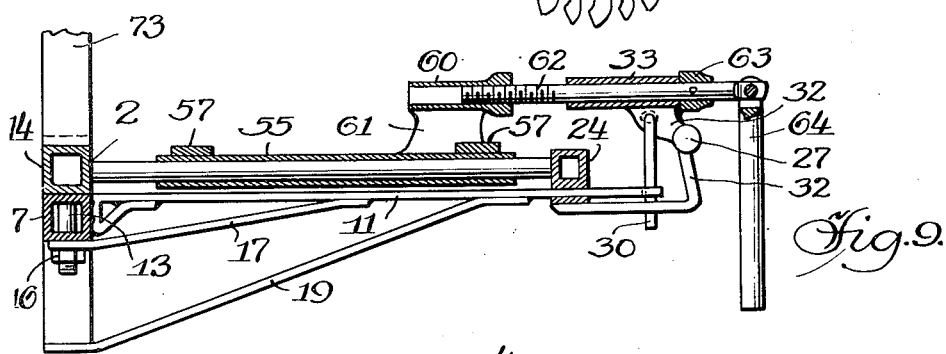
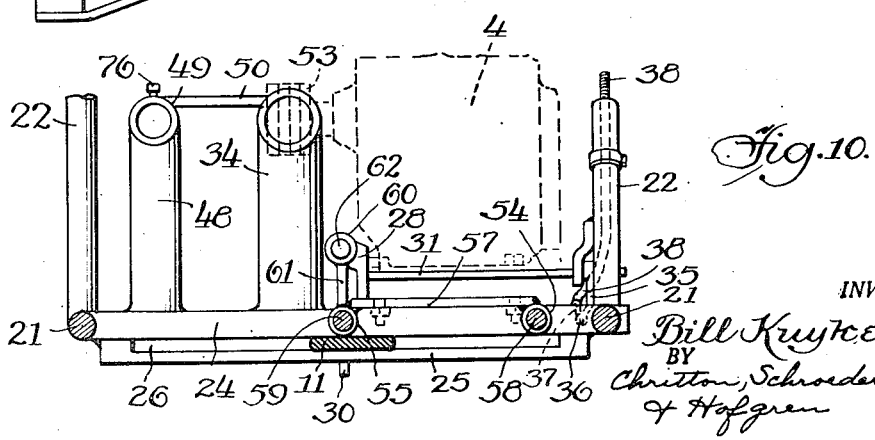

Patented Dec. 7, 1948

2,455,369

UNITED STATES PATENT OFFICE 2,455,369

MANUALLY GUIDED TWO-WHEELED PORTABLE CIRCULAR POWER SAW

Bill Kuykendall, Buda, Tex.

Application April 12, 1946, Serial No. 661,765

4 Claims. (Cl. 143—43)

This invention relates to a power saw and more particularly to a portable circular power saw operable by one man in the woods or other places for felling timber, cutting up logs and limbs and other general sawing purposes, with maximum ease and maneuverability.

The present invention is an improvement over that of United States Letters Patent No. 2,353,873 granted July 18, 1944, to Robert L. Brownlee for "Timber saw." In saws of this general type, prior to my invention, the saw supporting arm during operation of the saw was fixed to a frame supported upon a pair of wheels, and in making the cut while felling a tree it was necessary to swing the entire device sidewise in order to move the saw into the cut. This was accompanied by rolling one or both of the supporting wheels over the ground such amount as was necessary in making the cut. During this rolling movement of the wheel or wheels over the ground, one or both of the wheels would often strike a rock, stake, depression or other obstacle which would cramp the saw in its cut and cause considerable trouble in the cutting operation. As will be understood the dropping of the rolling wheel into a depression would immediately cramp the saw in its cut, and the further rolling of the wheel over a raised obstacle would at that time cramp the saw.

Also when bucking a log, or trimming limbs therefrom with such prior construction, it was often necessary or desirable to roll one or the other, or both of the wheels, over the ground in order to swing the frame and saw to an angular position with relation to the log in order to move the saw to the desired place of cut. Should a raised obstacle or depression be encountered by the rolling wheel or wheels trouble would arise either from cramping the saw or inability to place the saw where desired, depending upon what particular operation was sought to be carried out.

Among the objects of my invention are: to overcome the disadvantages and accomplish the advantages referred to above; to provide a novel and improved portable circular power saw; to provide means for swingably mounting the saw supporting arm upon the primary frame for lateral swinging movement of the saw and arm relatively to the primary frame, while permitting said frame and wheels to remain stationary; to provide reasonable locking means for locking the arm and saw in fixed position with relation to the primary frame, and when desired releasing said locking means to enable the saw and arm to swing with relation to said frame; to provide a primary wheel supported frame and a secondary frame pivotally mounted on the primary frame, the secondary frame having mounted thereon a saw supporting arm, saw, engine and associated driving connections; to provide means on the secondary frame for swinging the saw from a horizontal to a vertical plane regardless of the amount of swinging of the secondary frame on the primary frame; to provide novel means for moving the engine and its drive pulley longitudinally of the secondary frame to selectively tighten and loosen the belt which drives the saw; to provide novel means for applying to the saw in adjusted amounts, a liquid for preventing undue retention of sawdust in the teeth of the saw; and such further objects, advantages and capabilities inherently possessed by my invention as will later more fully appear.

My invention further resides in the combination, construction and arrangement of parts illustrated in the accompanying drawings, and while I have shown therein a preferred embodiment I wish it understood that the same is susceptible of modification and change without departing from the spirit of my invention.

In the drawings:

Fig. 1 is a perspective view of a portable circular power saw embodying my invention and showing the engine in dotted lines.

Fig. 2 is a miniature diagrammatic perspective view with the saw in horizontal position just prior to starting the cut for felling a tree.

Fig. 3 is a view similar to Fig. 2 but showing the saw swung sidewise and the wheels and the primary frame remaining in their initial position.

Fig. 4 is a view similar to Fig. 2 but showing the saw occupying a vertical position with the saw, handles and secondary frame swung laterally to a different sidewise position as shown in dotted lines.

Fig. 5 is a fragmentary top plan view of the main frame and secondary frame in central position with relation to each other and omitting the engine, wheels and saw.

Fig. 6 is a fragmentary vertical longitudinal section on the line 6—6 of Fig. 5.

Fig. 7 is a view similar to Fig. 5 but showing the secondary frame as swung sidewise with relation to the primary frame.

Fig. 8 is a fragmentary front elevation looking toward the right hand side of Fig. 5.

Fig. 9 is a fragmentary vertical longitudinal section on the line 9—9 of Fig. 5 and looking in the direction of the arrows.

Fig. 10 is a vertical transverse section on the line 10—10 of Fig. 5 and showing a portion of the engine in dotted lines.

Fig. 11 is a fragmentary enlarged horizontal longitudinal section through the rear end portion of the saw supporting arm, and showing it swung to and secured in horizontal position to position the saw in a vertical plane.

Fig. 12 is a fragmentary perspective view of my power saw omitting the engine and showing the saw swung into a vertical plane.

In the form shown in the drawings my portable circular power saw comprises a primary frame 1, a secondary frame 2, a circular saw 3, an engine 4 and belts 5 for driving the saw 3 which is rotatably mounted on and with a mandrel in the saw bearing 6. The primary frame 1 comprises the axle member 7 to each end of which is rigidly fixed an upright member 8, to each of which is fixed an outwardly projecting axle 9 upon each of which axles is rotatably mounted a wheel 10 having either a pneumatic or other form of tire as desired. Fixed to axle member 7 and projecting rearwardly and centrally therefrom is a flat metal plate or strip 11 having in its rear end a notch 12, see Figs. 6 and 7. The secondary frame 2 is pivotally mounted for lateral swinging movement on the primary frame by means of a king pin or bolt 13 fixed to the front bar 14 of the secondary frame and extending centrally downwardly through aligned openings 15 formed in the hollow axle member 7, this king pin or bolt being threaded at its lower end to receive a nut 16. Between the upper surface of nut 16 and the lower surface of axle member 7 is the front end of a reinforcing strut 17 apertured at its front end to receive the king pin 13 and be held against the axle member by sufficient pressure exerted by nut 16 to securely hold these parts together but yet permit the secondary frame to swing around pin 13 in a sidewise direction upon the primary frame. Strut 17 at its rear end is welded or otherwise secured to the under face of the rearwardly projecting strip 11 of the primary frame, strip 11 being welded or otherwise secured to the axle member 7 at 18. If desired, the supporting strut 17 instead of being held against the axle member by nut 16 may be in the form of a pair of such supporting struts positioned one on each side of the nut 16 and welded or otherwise fixed to the bottom face of the axle member.

Also, welded at their rear ends to the strip 11 of the primary frame are a pair of outwardly and downwardly diverging supporting struts 19 which, as shown in Figs. 5, 6 and 8, are welded or otherwise fixed to the bottom ends of the upright members 8 of the main frame. Struts 19 and 17 rigidly secure the strip 11 of the main frame in central longitudinal position with relation to the axle member 7. The secondary frame 2 is made up of the forwardly positioned cross member 14, which, when the secondary frame is centrally positioned upon the primary frame, is parallel to the axle member 7 and positioned directly thereabove to have rotatable sliding contact therewith. Extending rearwardly from the front member 14 and one upon each side of the secondary frame, are a pair of side bars or rods 21, which at their rear ends are bent to incline upwardly at 22 and at their upper ends are extended rearwardly in the form of handles 23.

Rigidly fixed to each of side bars 21 and extending laterally therebetween is a brace 24 preferably formed of hollow rectangular metal and having welded or otherwise fastened therebeneath near its ends a parallel strip 25 of a length slightly less than that of the cross member 24. Strip 25 is spaced a distance below the bottom face of cross member 24 sufficiently to form a slot 26 (see Fig. 10) to slidably receive the rear end portion of the strip 11 when not locked in central position as later more fully explained. Also fixed to the side bars 21 and extending laterally therebetween, preferably parallel to cross bar 24, is another cross bar 27 positioned at a distance rearwardly of the cross bar 24. Fixed to depend centrally from cross bar 27 is a supporting member 28, which, just below the level of strip 25, is bent to extend forwardly and at its forward end is welded or otherwise fixed to the lower face of the keeper strip 25. This forwardly extending portion of member 28 is formed with a longitudinal slot 29 to slidably retain the lower end of a level 30 fixed to a laterally extending rod 31 which, at one end is rotatably mounted in one of the side bars 21, and at the other end is rotatably mounted in a lug or small flange 32 welded or otherwise fixed to the cross bar 27 and also to the tubular member 33. This tubular member 33 is also welded or otherwise fixed at its forward end to one side of the upstanding tubular member 34, which, at its lower end (as shown in Fig. 6), is welded or otherwise fixed to the upper face of the cross bar 24.

Fixed to the rod 31 to extend downwardly therefrom is an arm 35 (Fig. 10) which at its lower end is formed with an eyelet 36 to which is secured the end of a wire 37, which slidably passes through a cable 38 fixed at its lower end to one of the inclined rods 22 and extending upwardly to near the rear end of the corresponding handle 23. Wire 37 slidably moves in cable 38 and emerges from said cable at its rear end where it is connected to a latch member 39 positioned to be easily grasped by the hand of the operator. When latch 39 is grasped by the operator and moved upwardly, wire 37 will be pulled rearwardly and cause rotation of rod 31 which will swing the lower end of arm 30 rearwardly out of notch 12 to free the secondary frame from the primary frame and permit the former to swing in a sidewise direction upon the primary frame (see Fig. 7). Secured at one end to arm 30 and at the other end to the cross bar 24 is a coil spring 40 (Fig. 6) so tensioned as to normally hold the lower end of arm 30 in notch 12. As seen in Fig. 7 the rear end of member 11 is curved toward notch 12 so that when the secondary frame swings back into its central position with relation to the primary frame the front edge of arm 30 will be guided by said curved end of member 11 and caused to enter notch 12 by spring 40 when in registry therewith. This enables the operator to quickly release arm 30 from notch 12 and swing the secondary frame laterally, it being only necessary to grasp latch 39 long enough to move arm 30 out of notch 12 and swing the secondary frame a small distance laterally after which the operator may release the latch.

The upright tubular member 34, which as stated is fixed to cross bar 24, is, at its upper end, welded or otherwise fixed to a short horizontal tubular member 41 which extends longitudinally of the secondary frame. Pivotally mounted in tubular member 41 is a stub shaft 42 (Fig. 11) extending forwardly at 43 from whence it depends at 44 to a bottom tubular member 45 which, at its rear end is open and at its forward end has fixed therein a cylindrical extension 46 forming the rear end of a saw supporting tubular arm 47.

Also fixed by welding or otherwise, to extend upwardly from cross bar 24 is a tubular member 48 which is spaced laterally from the upright tubular member 34 a distance such that when what might be called the crank arm 44 (see Fig. 11) is swung from vertical to horizontal position, the hollow interior of the rear end of tube 45 will be in registry with the hollow interior of the tubular member 49 fixed upon the upper end of the upstanding tubular member 48, which latter is rigidly braced to the tubular member 41 by a laterally extending supporting arm 50. Longitudinally slidable in tubular member 49 is a short cylindrical plug 51 so that when the rear end of the saw supporting arm is swung upwardly into registry with tubular member 49 plug 51 may be slid forwardly to cause its front end to extend into the rear open end of tube 45 to rigidly support the saw supporting arm in upwardly swung position to carry the saw from a horizontal plane to a vertical plane. As seen in Fig. 1 the saw supporting arm 47 extends a substantial distance forwardly beyond the axle member 7 of the primary frame, and has fixed at its forward end a saw supporting bearing tube 6 extending at a right angle to the saw supporting arm 47. The saw is fixed by a nut or the like to the lower end of a shaft rotatably mounted in bearing tube 6 and provided at its upper end with a pulley 52 having grooves to receive a plurality of V-belts 5 for driving the saw from the engine as later more fully explained. The engine 4, which is slidably mounted upon the secondary frame as later more fully described, is provided with a horizontally extending pulley 53 having grooves for V-belts 5, for driving the circular saw from the engine. As noted in Fig. 1, the axis of the pulley 53 is horizontal, and the axis of the pulley 52 is vertical when the saw is in horizontal plane. When the saw is turned to occupy a position in a vertical plane the V-belts will stand in a normal position as shown in Fig. 12, as compared with the 90° twist as shown in Fig. 1.

The engine is secured by bolts or other suitable fastening means to the sliding base comprising laterally spaced apart tubular members 54 and 55 rigidly fixed together by cross bars 56 and 57, tubular members 54 and 55 being longitudinally slidably mounted on the rods 58 and 59, which rods are fixed at their ends to the front end member 14 and the cross bar 24 of the secondary frame, see Fig. 5. It is thus seen that the engine, when fixed to this base construction, is capable of longitudinal movement with relation to the secondary frame. In order to provide means for adjusting the engine in such longitudinal direction, there is provided an interiorly threaded tubular member 60 fixed to rib 61, which in turn is rigidly fixed to the upper side of tubular member 55 of the engine base (see Figs. 5, 7 and 9). Rotatably mounted in the interiorly threaded tube 60 is a threaded rod 62 so that rotation of this rod will cause advancing or retarding engagement of the threads thereof with the threads in the tube 60. Rod 62 is rotatably mounted in the tubular member 33 and has fixed thereto a nut, collar or the like 63 rotatably abutting against the rear end of tubular member 33. Pivotally connected to the rear free end of rod 62 is a handle 64 which may be operated as a crank handle to rotate rod 62. From this construction it will be seen that rotation of rod 62 will cause longitudinal movement of the engine on the secondary frame in either a forward or rearward direction depending upon the direction in which handle 64 is rotated, which will enable the tightening or loosening of the V-belts 5 when desired. This enables the belts to be loosened when it is desired that they be removed from their pulleys, or tightened any selective amount in order to give proper gripping action between the V-belts and the pulley grooves.

As noted in Figs. 6, 8 and 11 the saw supporting arm 47 is tubular and closed at its rear end by the wall 65 and closed at the front end by a similar wall adjacent the saw mandrel 6. This forms a closed compartment 66 serving as a reservoir for containing kerosene or other suitable liquid to be dropped onto the upper face of the saw for preventing undue retention of sawdust in the teeth of the saw. The tubular supporting arm 47 is provided adjacent its rear end with a threaded opening within which is removably mounted a threaded closure plug 67 which may be removed when desired for filling liquid into the reservoir 66. Formed in the bottom face of the forward end of the saw supporting arm is an opening within which is threaded a suitable pipe connection 68 having mounted thereon a small adjusting valve 69 for adjusting the flow of kerosene and the like through pipe 70 to the downwardly directed nozzle 71 spaced a small distance above the upper face of the saw. With a supply of kerosene or other suitable liquid in the chamber 66, the valve 69 may be opened a desired small amount to permit the liquid to drop upon the face of the saw with any rapidity or slowness desired. When the saw is stopped this valve will be closed.

Saw supporting arm 47 is provided, at an intermediate position, with an outwardly extending handle loop 72 which may be grasped by the hand of the operator for rotating the saw supporting arm and swinging the saw from horizontal to vertical position or vice versa. Fixed upon the cross member 14 of the secondary frame is a circular metal band 73. The lower face of the saw supporting arm as viewed in Fig. 1 slides circumferentially against the inner face of band 73. In order to fixedly hold the saw supporting arm in any position which it may occupy within the band 73 there is fixed to the saw supporting arm, in registry with band 73, a clamping member 74 having movable fingers 75, one on each side, for actuating spring pressed jaws for gripping the circular band 73. Any other suitable means for causing such securing of the saw supporting arm in various adjusted positions may be used as desired. The holding of the saw supporting arm, when swung to bring the saw in vertical position, is further supplemented by the plug 51 entering tube 45 when these parts are brought into registry, as described in connection with Fig. 11. When plug 51 has been pushed forward to secure these parts together, it will be releasably fixed in that position by tightening set screw 76 (Fig. 1) which is threadably mounted in the tubular member 49. The handle members 22 and 23 are further braced near their upper ends by the cross rod 77 upon which is rotatably mounted the supporting leg 78 so that when this leg stands in vertical position as viewed in Fig. 1 the machine may remain stationary on the ground without tilting downwardly at either end due to the greater part of the weight of the machine being between the axle member 7 and the leg 78.

From the above it is seen that the secondary frame is laterally rotatable in a sidewise direction upon the primary frame, thus eliminating the necessity of bodily rotating the entire machine to roll the wheels 10 upon the ground, which rolling of the wheels upon the ground, as stated earlier herein, may be impossible, or extremely inconvenient, by reason of one or the other, or both, of the wheels striking a rock 19 or other obstacle and thus preventing their further movement. To roll the wheels over such rock, stump, cavity, or other obstruction would cramp the saw in its cut in the tree being felled, and thus stop further operation, possibly resulting in breaking the saw. This difficulty has been herein overcome by the novel construction described above which enables the lateral swinging of the saw and the saw supporting arm independently of the primary frame so that the primary frame and the wheels may remain stationary above the ground, thus obviating the danger of striking obstructions as referred to above. Also, when bucking logs and cutting limbs it is often desirable to swing the saw, which stands in a vertical position, in a sidewise direction to enable the saw to reach a desired point of cut. This is very conveniently and easily done by the rotatable secondary frame referred to above, the primary frame and the wheels remaining stationary on the ground. The provision of means for dropping kerosene or other desirable liquid upon the saw adds a great advantage to the present machine as it conveniently and easily makes possible such accomplishment while the saw is in operation. The longitudinal adjustment of the engine on the secondary frame makes possible the accomplishment of a wide range of further advantages in this type of machine and selective control of the tautness of the belt.

I claim:

1. In a portable circular power saw, a pair of ground wheels, a primary frame mounted upon said wheels, a secondary frame pivoted to the primary frame for lateral swinging movement thereon, said secondary frame having mounted thereon an engine, a saw supporting arm and a circular saw, said primary frame having an axle member upon which said wheels are supported, the secondary frame having a cross bar adjacent said axle member, and a substantially vertical pivot pin carried by one of said axle member and cross bar and pivotally connected with the other to enable said swinging movement, the secondary frame having an additional cross bar spaced rearwardly from the first mentioned cross bar and having an elongated slot extending laterally of the secondary frame, said axle member having a rearwardly extending member fixed thereto and extending through said slot for sliding movement therein during said swinging movement, and means for detachably locking said rearwardly extending member in central position in said slot.

2. A portable circular power saw as claimed in claim 1, in which the secondary frame is provided with a rearwardly extending handle fixed thereto to be grasped by an operator for swinging the secondary frame laterally on the primary frame, said handle having an extended member provided with a latch in position to be readily grasped by a hand of the operator for releasing said locking means to enable swinging of the secondary frame while the primary frame and its wheels remain stationary.

3. In a portable circular power saw, a pair of ground wheels, a primary frame mounted upon said wheels, a secondary frame pivoted to the primary frame for lateral swinging movement thereon, an engine, a saw supporting arm and a circular saw mounted on said secondary frame for movement therewith, said primary frame having an axle member upon which said wheels are supported, the axle member having a rearwardly extending member fixed thereto and having in its rear end a notch, the secondary frame having in its rear end a lateral slot in which the rear end portion of the rearwardly extending member is slidable, a swingable arm pivoted to the secondary frame, spring means for urging said swingable arm into said notch when in registry therewith, and means for forcibly moving the swingable arm out of the notch to free the secondary frame for swinging it laterally with relation to the primary frame.

4. A portable circular power saw as claimed in claim 3, having a pair of rearwardly extending handles fixed to said secondary frame for swinging it on the primary frame, and means on one of said handles for operating said means for forcibly moving the swingable arm out of the notch.

BILL KUYKENDALL.

REFERENCES CITED

The following references are of record in the file of this patent:

UNITED STATES PATENTS

| Number | Name | Date |
|---|---|---|
| 458,523 | Elliott | Aug. 25, 1891 |
| 910,145 | O'Hara | Jan. 19, 1909 |
| 1,454,901 | McArthur | May 15, 1923 |
| 1,462,764 | Nyquist et al. | July 24, 1923 |
| 1,609,651 | McMillan | Dec. 7, 1926 |
| 1,756,932 | Bacher | May 6, 1930 |
| 1,878,983 | Harris | Sept. 20, 1932 |
| 2,224,757 | Wixson | Dec. 10, 1940 |
| 2,274,902 | Knight | Mar. 3, 1942 |
| 2,353,873 | Brownlee | July 18, 1944 |

FOREIGN PATENTS

| Number | Country | Date |
|---|---|---|
| 122,266 | Great Britain | Jan. 23, 1919 |
| 101,436 | Australia | June 24, 1937 |
| 118,817 | Australia | Aug. 14, 1944 |